United States Patent [19]
Carver, Jr. et al.

[11] Patent Number: 5,542,452
[45] Date of Patent: Aug. 6, 1996

[54] VALVE ASSEMBLY

[75] Inventors: Edward L. Carver, Jr., Oxford; Steven Skiptunas, Naugatuck, both of Conn.

[73] Assignee: CDC Technologies, Inc., Oxford, Conn.

[21] Appl. No.: 385,145

[22] Filed: Feb. 7, 1995

[51] Int. Cl.⁶ .................................................. F16K 11/00
[52] U.S. Cl. ................... 137/625.48; 417/510
[58] Field of Search ................ 137/625.48; 417/504, 417/510

[56] References Cited

U.S. PATENT DOCUMENTS

| | | | |
|---|---|---|---|
| 4,236,881 | 12/1980 | Pfleger | 417/510 X |
| 5,313,984 | 5/1994 | Garwood, Jr. et al. | 137/625.48 |

OTHER PUBLICATIONS

Component Catalog with Engineering Reference Material, Sixth Edition, pp. II, III, 38–52 and 54–67, Mar. 1994.

*Primary Examiner*—John C. Fox
*Attorney, Agent, or Firm*—McCormick, Paulding & Huber

[57] ABSTRACT

In a valve assembly exhibiting zero dead volume the port head is mounted on a solenoid and defines an inlet port on one side of the valve seat, and two outlet ports on the opposite side of the valve seat. A flexible diaphragm is seated across the valve seat between the port head and the solenoid, and is sealed along its peripheral edge. A spring-biased valve rod is coupled to the opposite side of the diaphragm relative to the valve seat, and the solenoid is actuated to move the valve rod and diaphragm between open and closed positions. The valve assembly is opened by actuating the solenoid to drive the valve rod and diaphragm away from the valve seat and permit the passage of fluid across the valve seat between the inlet and outlet ports. The valve assembly is then closed by de-energizing the solenoid, which in turn permits the spring-biased valve rod and diaphragm to move into engagement with the valve seat to prevent the passage of fluid across the valve seat between the inlet and outlet ports, and to permit the passage of fluid between the two outlet ports.

15 Claims, 2 Drawing Sheets

VALVE ASSEMBLY

FIELD OF THE INVENTION

The present invention relates to valve assemblies for controlling fluid flow, and more specifically, to valve assemblies having substantially zero dead volume, particularly useful for controlling the flow of relatively small, exact quantities of fluids.

BACKGROUND INFORMATION

Many valve assemblies for regulating fluid flow retain a certain volume of fluid within the valve, which is typically referred to as dead volume. Dead volume can be a particular problem when the valve is installed in apparatus for metering relatively small, exact quantities of fluid, such as hematology and immunology testing apparatus, and other apparatus for fluid-particle analysis. As one example, a typical miniature solenoid valve assembly used for regulating the flow of reagents or blood samples in hematology testing apparatus may have a dead volume on the order of approximately 20 µl. Accordingly, with relatively small reagent or blood volumes, on the order of 60 µl, for example, the dead volume of the valve can consume and waste a substantial portion of the sample. Moreover, if several such valve assemblies are used within the same apparatus, the total dead volume of the apparatus increases with each additional valve, which can in turn lead to a substantial waste of the fluids being tested.

In FIG. 1, a typical prior art solenoid valve assembly is illustrated schematically and indicated generally by the reference numeral 1. The valve assembly 1 includes a port head 2 mounted on a solenoid 3. The port head defines an inlet port 4, an outlet port 5, and a valve seat 6 formed on the inner side of the port head between the inlet and outlet ports. A flexible diaphragm 7 is seated between the port head 2 and solenoid 3, and is sealed along the diaphragm's peripheral edge. A valve rod 8 is coupled between the diaphragm 7 and solenoid 3 for moving the diaphragm relative to the valve seat to open and close the valve, as indicated by the arrows in FIG. 1. A spring 9 is coupled to the valve rod 8 and normally biases the rod and diaphragm into engagement with the valve seat 6 to close the valve, as shown in FIG. 1.

The valve assembly is opened by energizing the solenoid 3, which drives the valve rod 8 downwardly in FIG. 1, and in turn moves the diaphragm 7 away from the valve seat 6, thus opening the passageway between the inlet port 4 and outlet port 5 to permit fluid flow through the valve assembly. The valve assembly may then be closed by de-energizing the solenoid, which in turn permits the spring 9 to drive the valve rod 8 and diaphragm 7 into engagement with the valve seat 6, as shown in FIG. 1, thus closing the passageway between the inlet and outlet ports and preventing fluid flow through the valve assembly.

In the example of FIG. 1, the valve assembly 1 is arranged to transfer fluid with a syringe or like pump A from a first vessel B into a second vessel C, and thus the outlet port 5 of the valve assembly is coupled between the syringe and second vessel by a T-fitting D. In order to draw the fluid from the first vessel B, the solenoid 3 is actuated to drive the diaphragm 7 away from the valve seat 6, thus permitting the syringe pump A to draw the fluid through the inlet and outlet ports, and in turn through the T-fitting D and into the tube leading to the pump. Then, the valve assembly is closed by driving the diaphragm 7 into engagement with the valve seat 6, and the syringe A is actuated to pump the fluid back through the T-fitting D and into the second vessel C.

As can be readily appreciated, after the fluid is drawn from the vessel B into the tube leading to the syringe pump A and the valve assembly is closed, a volume of fluid is trapped in the dead space between the diaphragm 7 and T-fitting D, thus defining the dead volume of the valve assembly, as indicated in FIG. 1. Even if the T-fitting D were moved as close as possible to the outlet port 5, a dead volume between the outlet port and diaphragm would still exist. Not only can this dead volume be relatively substantial, particularly when the volume of a fluid sample is relatively small, but the dead volume may vary from one valve assembly to another, and from one instrument to another, thus leading to inconsistencies and uncertainties in test results.

Accordingly, it is an object of the present invention to provide a valve assembly having a substantially zero dead volume, and which thus overcomes the drawbacks and disadvantages of such prior art valve assemblies in a simple and cost-effective manner.

SUMMARY OF THE INVENTION

The present invention is directed to a valve assembly exhibiting substantially zero dead volume, comprising a port head defining a valve seat, an inlet port located on an inlet side of the valve seat for introducing fluid through the valve assembly, and two outlet ports coupled in fluid communication with each other, and located on the opposite and outlet side of the valve seat. A valve member of the assembly is movable between (i) a closed position engaging the valve seat and preventing the passage of fluid across the valve seat between the inlet port and two outlet ports, and permitting fluid flow between the two outlet ports, and (ii) an open position spaced away from the valve seat and permitting fluid flow across the valve seat between the inlet port and two outlet ports.

In one embodiment of the present invention, the valve member is formed by a flexible diaphragm coupled on its peripheral edge to the port head. The valve assembly preferably further comprises a valve rod coupled to the opposite side of the diaphragm relative to the valve seat, and a solenoid coupled to the valve rod for moving the valve rod and diaphragm between the open and closed positions.

In another embodiment of the present invention, the port head includes a plurality of inlet ports located on the inlet side of the valve seat, and a plurality of outlet ports located on the outlet side of the valve seat. The additional ports may be provided for accommodating additional fluid-handling components.

One advantage of the valve assembly of the present invention, is that because there are two outlet ports, both located on the outlet side of the valve assembly, all of the metered fluid that passes through the inlet port and into the first outlet port, may then be pumped back through the second outlet port, without retaining fluid within the valve assembly. Accordingly, a valve assembly exhibiting substantially zero dead volume is provided in a relatively simple and cost-effective manner.

Other advantages of the present invention will become apparent in view of the following detailed description and accompanying drawings.

DETAILED DESCRIPTION

Figure 3:
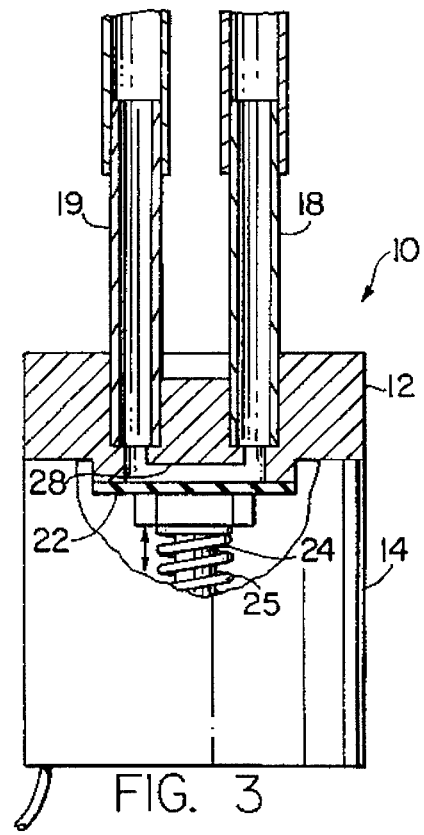
FIG. 3 is a side plan view of the valve assembly of FIG. 2 in partial cross section taken along line 3—3 of FIG. 2.
Figure 2:
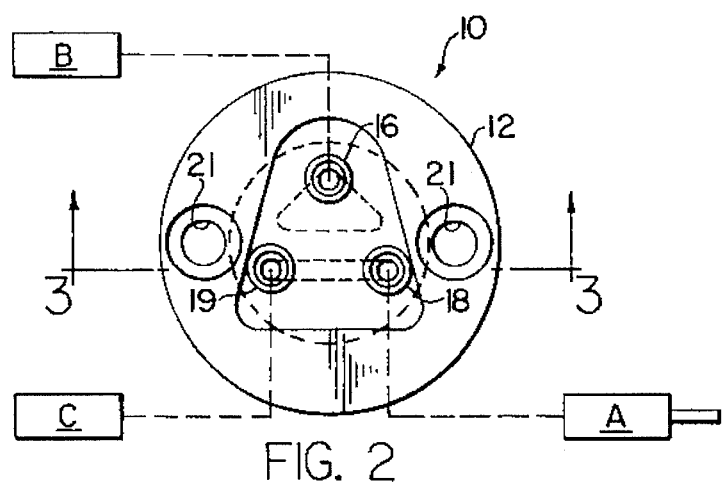
FIG. 2 is top plan view of a valve assembly embodying the present invention shown schematically connected between a syringe pump and first and second fluid vessels.
Figure 4:
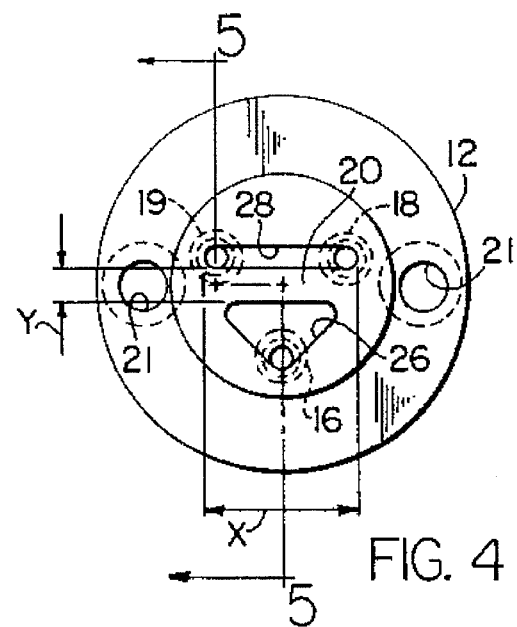
FIG. 4 is a bottom plan view of the port head of the valve assembly of FIG. 2.

In FIGS. 2 through 5, a valve assembly embodying the present invention is indicated generally by the reference numeral 10. As shown in FIG. 3, the valve assembly includes a port head 12 mounted on a solenoid 14. The port head defines an inlet port 16, and first and second outlet ports 18 and 19, respectively. As shown best in FIG. 4, a valve seat 20 is formed on the inner side of the port head and extends between the inlet port 16 and the two outlet ports 18 and 19. As shown in FIGS. 2 and 4, the port head also defines a pair of mounting apertures 21 for receiving screws (not shown) to attach the port head to the housing of the solenoid 14.

As shown in FIG. 3, a valve member in the form of a flexible diaphragm 22 is seated between the port head 12 and solenoid 14, and is sealed along the diaphragm's peripheral edge. A valve rod 24 of the solenoid is attached to the diaphragm on the opposite side of the valve seat 20 for moving the diaphragm away from and toward the valve seat to open and close the valve, respectively, as indicated by the arrows in FIG. 3. An open coil spring 25 is coupled to the valve rod 24 and normally biases the valve rod and diaphragm into engagement with the valve seat 20 to close the valve assembly, as shown in FIG. 3. Actuation of the solenoid 14 causes the valve rod 24 and diaphragm 22 to move downwardly in FIG. 3 against the bias of the spring to open the valve assembly, as is described further below. Accordingly, the valve assembly 10 is normally closed by virtue of the spring-biased valve rod 24. As will be recognized by those skilled in the pertinent art, however, the valve assembly of the invention may equally be constructed as a normally-open solenoid valve. This may be achieved, for example, by replacing the open coil spring 24 with a closed coil spring, which would normally bias the valve rod and diaphragm into the open position. In this situation, energization of the solenoid would drive the valve rod and diaphragm into engagement with the valve seat to close the valve assembly.

Figure 5:
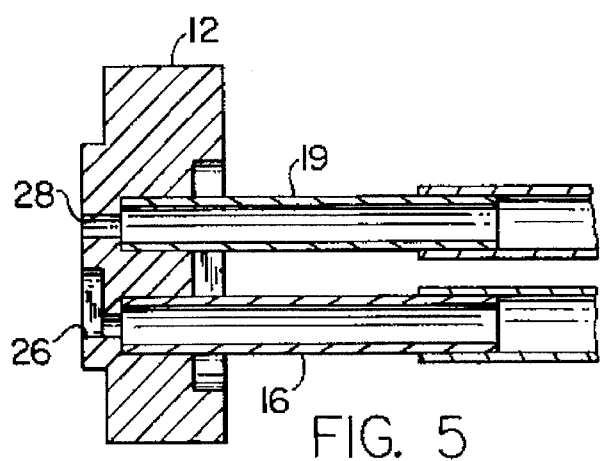
FIG. 5 is a cross-sectional view of the port head of FIG. 4 taken along line 5—5 of FIG. 4.

As shown best in FIGS. 3 through 5, the port head 12 defines a first or inlet recess 26 on the inlet side of the valve seat 20, and a second or outlet recess 28 on the outlet side of the valve seat extending between the first and second outlet ports 18 and 19. In the embodiment of the present invention illustrated, the diameter of each inlet and outlet port, along with the width (the narrow dimension) of the outlet channel 28 are each approximately 0.6 mm.

As shown schematically in FIG. 2, the valve assembly 10 may be arranged to transfer fluid with a syringe or like pump A from a first vessel B into a second vessel C. In order to draw fluid from the first vessel B, the solenoid 14 is actuated to drive the diaphragm 22 away from the valve seat 20, thus permitting the syringe pump A to draw fluid from the first vessel B through the inlet port 16, and in turn through the first outlet port 18 and into the tube leading to the pump. Then, the valve assembly is closed by de-energizing the solenoid, which permits the spring 25 to force the diaphragm 22 into engagement with the valve seat 20. The syringe pump A is then actuated to pump the metered fluid back through the first outlet port 18, through the outlet recess or channel 28, and in turn through the second outlet port 19 into the vessel C.

One advantage of the valve assembly of the present invention, is that the dead volume of the prior art valve assemblies is eliminated; in other words, the valve assembly has zero dead volume. All of the fluid metered by the syringe pump A is drawn through and into the first outlet port 18. Then, when the valve assembly is closed, all of the metered fluid is pumped in the opposite direction back through the first outlet port 18, into the outlet channel 28, and through the second outlet port 19 into the vessel C. Accordingly, there is essentially no metered fluid retained by the valve assembly, which thus defines substantially zero dead volume.

Figure 1:
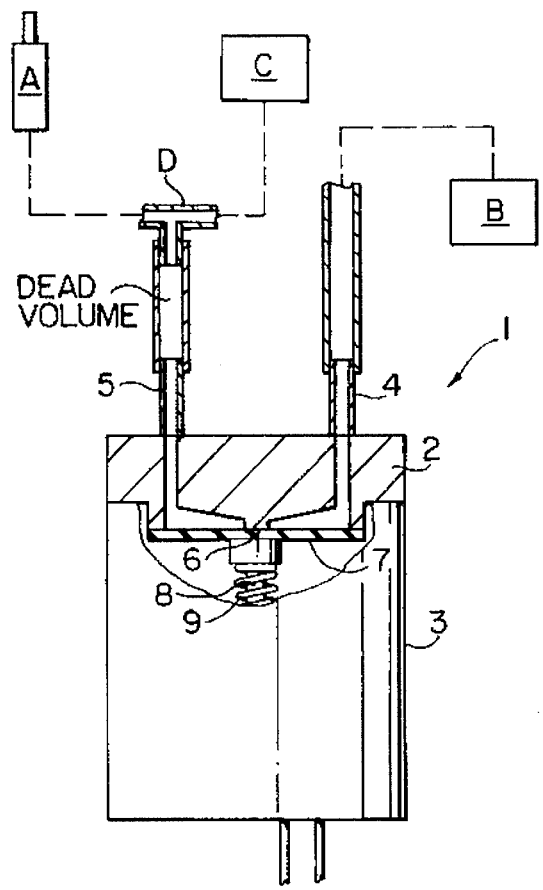
FIG. 1 is a schematic illustration of a prior art solenoid valve assembly.

Another advantage of the present invention, is that the valve assembly with zero dead volume can be obtained with relatively slight modifications to the port head of prior art valve assemblies, as shown, for example, in FIG. 1, thus providing zero dead volume in a simple and cost-effective manner.

Yet another advantage of the present invention, is that the valve seat 20 is preferably constructed so as to minimize the volume of fluid, if any, that can be trapped between the diaphragm and valve seat upon closure of the valve assembly. With reference to FIG. 4, the surface 20 of the valve seat is defined by a first dimension or length X extending between the first and second outlet ports 18 and 19, respectively, and a second dimension or width Y extending between the inner edges of the inlet recess 26 and outlet recess or channel 28. Accordingly, the dimension X is substantially equal to the length of the outlet channel 28, or is substantially equal to the linear distance between the two outlet ports. In the embodiment of the invention illustrated, the dimension Y is within the range of approximately 0.2 to 0.8 mm, and is preferably not greater than approximately 0.8 mm. This dimensional range minimizes the total surface area of the valve seat, while providing the valve seat with sufficient thickness to maintain its structural integrity and seal depending upon the material of the port head employed. Accordingly, the dimensions X and Y are selected as set forth above in order to minimize the total surface area of the valve seat 20 engaged by the diaphragm 22, and in turn minimize the volume of fluid, if any, that could be trapped between the valve seat and diaphragm in the closed position.

Figure 6:
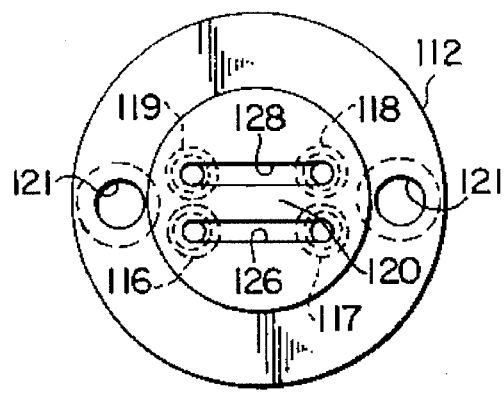
FIG. 6 is a bottom plan view of another embodiment of a port head of a valve assembly embodying the present invention wherein the port head includes two inlet ports and two outlet ports to accommodate additional fluid-handling components.

Turning to FIG. 6, the port head of another embodiment of a valve assembly of the present invention is indicated generally by the reference numeral 112. The port head 112 is the same in many respects as the port head 12 described above, and therefore like reference numerals preceded by the numeral 1 are used to indicate like elements. The essential difference in the port head 112 is that it includes a second inlet port 117. Accordingly, as shown in FIG. 6, the two inlet ports 116 and 117, and the inlet recess or channel 126, are essentially a mirror image of the two outlet ports 118 and 119, and the outlet recess or channel 128 on the opposite side of the valve seat. The additional inlet port 117 may be used to accommodate an additional pump, fluid chamber, vessel, or other fluid-handling component.

As will be recognized by those skilled in the pertinent art, additional inlet ports and outlet ports may similarly be added to either of the valve assemblies 10 or 110 to accommodate additional pumps, fluid chambers, vessels, or other fluid-handling components. Similarly, a plurality of the valve assemblies may be arranged together within a valve matrix for controlling the flow of several different fluids and/or the flow of fluids between a plurality of fluid-handling components. Accordingly, the preferred embodiments of the invention have been described above in an illustrative, as opposed to a limiting sense, and numerous changes may be made to these and other embodiments without departing from the scope of the invention as defined in the following claims.

We claim:

1. A valve assembly exhibiting substantially zero dead volume, comprising:

a port head defining a valve seat, a first port on a first side of the valve seat for introducing fluid through the valve assembly, a second port on a second side of the valve seat, which is the substantially opposite side of the valve seat relative to the first side, and a third port on the second side of the valve seat and in fluid communication with the second port;

a valve member moveable between an open position spaced away from the valve seat permitting the passage of fluid across the valve seat between the first port and the second and third ports, and a closed position in engagement with the valve seat preventing the passage of fluid across the valve seat between the first port and the second and third ports, and permitting the passage of fluid between the second and third ports; and means for moving fluid between the first port and second port with the valve member in the open position, and for moving fluid between the second port and third port with the valve member in the closed position.

2. A valve assembly as defined in claim 1, wherein the port head further defines a fourth port on the first side of the valve seat in fluid communication with the first port for introducing fluid through the valve assembly.

3. A valve assembly as defined in claim 1, wherein the valve member is formed by a flexible diaphragm coupled on its peripheral edge to the port head, and the valve assembly further includes a valve rod coupled to the opposite side of the diaphragm relative to the valve seat, and a solenoid coupled to the valve rod for moving the valve rod and diaphragm between the open and closed positions.

4. A valve assembly as defined in claim 1, wherein the port head further defines a channel extending between the second and third ports coupling the second and third ports in fluid communication.

5. A valve assembly as defined in claim 1, wherein the means for moving fluid is coupled in fluid communication with the second port for moving fluid through the first port and into the second port with the valve member in the open position, and for moving said fluid from the second port through the third port with the valve member in the closed position.

6. A valve assembly as defined in claim 1, wherein the means for moving fluid comprises a pump coupled in fluid communication with the second port.

7. A valve assembly exhibiting substantially zero dead volume, comprising:

an inlet port for introducing fluid into the valve assembly;

a valve seat;

means for substantially eliminating dead volume, including a first outlet port located on the opposite side of the valve seat relative to the inlet port, and a second outlet port located on the same side of the valve seat as the first outlet port and coupled in fluid communication with the first outlet port; and means for controlling fluid flow through the valve assembly and movable between (i) a closed position engaging the valve seat and preventing the passage of fluid across the valve seat between the inlet port and two outlet ports, and permitting fluid flow between the two outlet ports, and (ii) an open position spaced away from the valve seat permitting fluid flow across the valve seat between the inlet port and two outlet ports.

8. A valve assembly as defined in claim 7, comprising a plurality of inlet ports located on a first side of the valve seat, and a plurality of outlet ports located on a substantially opposite side of the valve seat relative to the inlet ports.

9. A valve assembly as defined in claim 7, wherein the means for controlling fluid flow includes a diaphragm coupled across the valve seat and movable between the open and closed positions.

10. A valve assembly as defined in claim 9, further comprising a valve rod coupled to the diaphragm and a solenoid coupled to the valve rod for moving the valve rod and diaphragm between the open and closed positions.

11. A valve assembly as defined in claim 7, wherein the valve seat is defined by an elongated surface, the elongated surface being defined by a length dimension approximately equal to the distance between the two outlet ports for substantially preventing fluid from being trapped against the valve seat upon closure of the valve assembly.

12. A valve assembly as defined in claim 11, wherein the elongated surface is further defined by a width dimension less than approximately 0.8 mm for further preventing fluid from being trapped against the valve seat upon closure of the valve assembly.

13. A valve assembly as defined in claim 7, further comprising means for moving fluid between the inlet port and first outlet port with the means for controlling fluid flow in the open position, and for moving fluid between the first outlet port and second outlet port with the means for controlling fluid flow in the closed position.

14. A valve assembly as defined in claim 13, wherein the means for moving fluid is coupled in fluid communication with the first outlet port for moving fluid from the inlet port and into the first outlet port with the means for controlling fluid flow in the open position, and for moving said fluid from the first outlet port through the second outlet port with the means for controlling fluid flow in the closed position.

15. A valve assembly as defined in claim 13, wherein the means for moving fluid comprises a pump coupled in fluid communication with the first outlet port.

* * * * *